US011624378B1

(12) United States Patent
Hays et al.

(10) Patent No.: US 11,624,378 B1
(45) Date of Patent: Apr. 11, 2023

(54) VOLUME EFFICIENT PNEUMATIC ARTIFICIAL MUSCLE (PAM)

(71) Applicant: The Government of the United States of America, as represented by the Secretary of the Navy, Arlington, VA (US)

(72) Inventors: Joseph T. Hays, Huntingtown, MD (US); Jordan Schlater, Raleigh, NC (US); Michael S. Kubista, Fairfax, VA (US); Phillip A. Feerst, Vienna, VA (US); Chris Netwall, Annandale, VA (US); Kerry (andy) Griffith, West Springfield, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 631 days.

(21) Appl. No.: 16/554,314

(22) Filed: Aug. 28, 2019

Related U.S. Application Data

(60) Provisional application No. 62/723,758, filed on Aug. 28, 2018.

(51) Int. Cl.
*B25J 9/14* (2006.01)
*F15B 15/10* (2006.01)
*B25J 9/10* (2006.01)

(52) U.S. Cl.
CPC .......... *F15B 15/103* (2013.01); *B25J 9/1075* (2013.01); *B25J 9/142* (2013.01)

(58) Field of Classification Search
CPC ......... F15B 15/103; B25J 9/1075; B25J 9/142
See application file for complete search history.

(56) References Cited

FOREIGN PATENT DOCUMENTS

CN 108105312 * 6/2018

* cited by examiner

*Primary Examiner* — William C Joyce
(74) *Attorney, Agent, or Firm* — US Naval Research Laboratory

(57) ABSTRACT

A pneumatic artificial muscle (PAM) includes a bladder containing, internal to the bladder, the other components of the PAM: at least one valve controlling pneumatic pressure inside the bladder; at least one sensor configured to sense pressure inside the bladder; and at least one signal conditioning device, thereby providing a self-contained, volume-efficient, simple interface for the PAM.

9 Claims, 3 Drawing Sheets

VOLUME EFFICIENT PNEUMATIC ARTIFICIAL MUSCLE (PAM)

RELATED APPLICATIONS

This application claims the benefit of U.S. Provisional Application No. 62/723,758 filed Aug. 28, 2018, which is hereby incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 109280-US2.

FIELD OF INVENTION

The present invention relates generally to pneumatic actuators, and more particularly to a volume-efficient pneumatic artificial muscle.

BACKGROUND

Currently, space robotic servicing capabilities have matured to the point where missions can be successful. However, mission costs are high and therefore robotic servicing has not yet been embraced due to the high cost and weight associated with robotics technology. It is still cheaper to rebuild and relaunch than it is to service a spacecraft. Therefore, it is of value to the community to develop servicing systems that are lighter. Lighter weight robotic manipulators contribute toward this need.

Pneumatic artificial muscles (PAMs) are linear actuators that use gas pressure in a variable diameter volume to provide linear force or motion. They use a high tensile strength fiber weave (braid) that encloses, or is embedded in, a thin membrane (bladder). When pressurized the bladder reacts with radial expansion and provides both linear displacement and force.

Various machine/robotic applications demand/seek for actuators with either high force-density (amount of force per unit of volume) or high specific-force (amount of force per unit of mass), or both. PAM actuators have both relatively high force-density and specific-force.

SUMMARY OF INVENTION

A pneumatic artificial muscle (PAM), includes a bladder; at least one valve controlling pneumatic pressure inside the bladder; at least one sensor configured to sense pressure inside the bladder; and at least one signal conditioning device. The at least one valve, the at least one sensor, and the at least one signal conditioning device are located within the bladder, providing a self-contained, volume-efficient, simple interface for the PAM.

Optionally, the PAM includes a sleeve located inside the bladder and configured to act as a housing for the at least one valve, the at least one sensor, and the at least one signal conditioning device. The sleeve is sealed against pressure changes within the bladder.

Optionally, the PAM includes a manifold within the sleeve providing structure for securing the at least one valve, the at least one sensor, and the at least one signal conditioning device. The manifold includes a pressure line and a return line configured to, with the at least one valve, selectively pressurize and depressurize the bladder, thereby providing a volume and mass efficient means of routing the pneumatic pressure and return lines.

Optionally, the manifold is removable for servicing, thereby providing ready access to the at least one valve, the at least one sensor, and the at least one signal conditioning device for servicing.

Optionally, the manifold is configured to provide electrical wire harnessing and strain relief.

Optionally, the manifold is configured to transfer heat from the at least one signal conditioning device to the manifold, thereby acting as a heat sink.

Optionally, a printed circuit board (PCB) of the at least one signal conditioning device includes an exposed conductor material thermally coupled to the manifold.

Optionally, the manifold and an end fitting of the PAM mate together with at least one O-ring that seals and isolates each flow path.

Optionally, the manifold and end fitting are both fastened to the sleeve.

Optionally, the PAM includes end fittings configured to provide electrical wire harnessing and strain relief.

According to another aspect of the invention, a dimensioning method to size end fitting components for pneumatic artificial muscles (PAMs) fabricated with a swaging process to achieve proper sealing and strength includes the steps of: setting a nominal internal diameter of a bladder ($ID_{bladder}$) of the PAM; setting a bladder thickness ($Th_{bladder}$); setting a braid thickness ($Th_{braid}$); setting a swage tube thickness ($Th_{tube}$); setting a percent compression of the bladder (%$C_{bladder}$); setting a percent compression of a braid (%$C_{braid}$); and determining a die inner passage diameter ($ID_{die}$) and an outer diameter of a plug knurled surface ($OD_{knurl}$) of the PAM using the following equations:

$$OD_{knurl} = ID_{bladder} + 2*Th_{bladder}*(1-\% C_{bladder}) + 2*Th_{braid}*\% C_{braid}$$

$$ID_{die} = ID_{bladder} + 2*Th_{bladder}*(1-\% C_{bladder}) + 2*Th_{braid} + 2*Th_{tube}.$$

The foregoing and other features of the invention are hereinafter described in greater detail with reference to the accompanying drawings.

DETAILED DESCRIPTION

Described here is a way to reduce the gas consumption and increase the volume efficiency of the PAM by leveraging miniaturization technology for spacecraft components that are traditionally large and massive. PAM actuation is a function of cross-sectional area, without regard to how much volume is pressurized. Exemplary PAMs reduce the pressurized volume by occupying it with functional components like valves, sensors, and electronics housed in a closed off volume inside the bladder, therefore minimizing the mass of gas required to actuate the PAM while allowing full contraction. It also relocates these essential components to reduce their vulnerability, to minimize the arm operating envelope, and to simplify mechanical, electrical and pneumatic interfacing.

Figure 1:
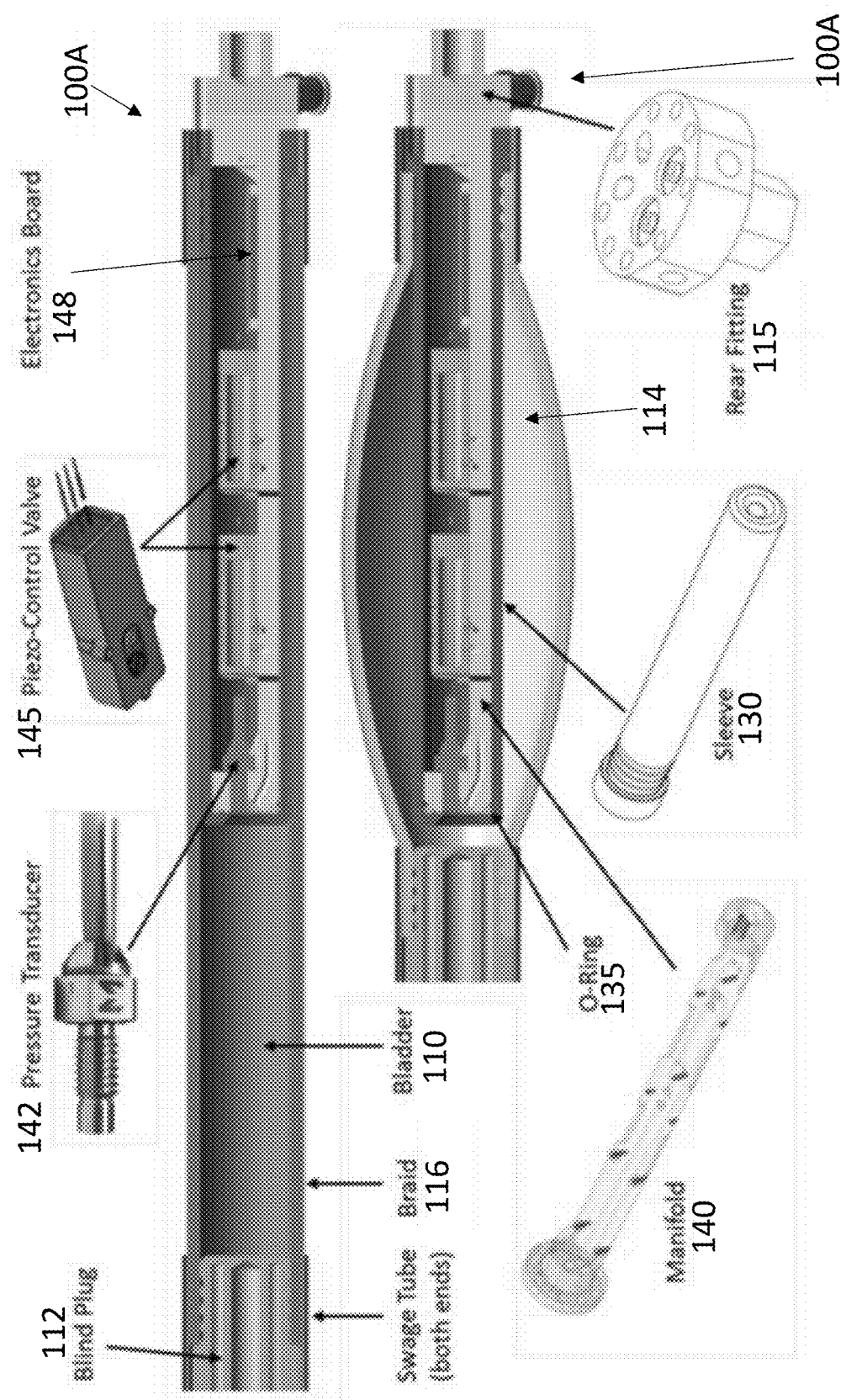
FIG. 1 shows a cross-section view of an exemplary PAM.

FIG. 1 shows a cross-section view of an exemplary PAM 100 in both the rest 100A and free contracted 100B states with subcomponents identified. The main body of the PAM is the bladder 110.

The bladder 110 may be any suitable flexible fluid retaining device, including, for example, a rubber or elastomeric tube with end fitting. In some embodiments, the braid may itself act as an outer skin of the bladder without an inner liner, while in other cases the braid merely acts as a reinforcement mechanism to add strength to an inner liner made of a flexible material and provide the mechanism and strength for turning the change of shape of the bladder into a tension, shortening the PAM and pulling, e.g., the arm of a robot. In an exemplary embodiment, the bladder 110 is generally made out of the blind plug 112, the ported plug 114 and the braid 116. The blind plug 112 is the side of the PAM bladder 110 that is allowed to move during actuation and controls the moving load. It may be mostly hollow via a threaded insert and may include lightening holes to reduce the mass without losing its strength in actuation or resistance to buckling during the swaging process. The ported plug 114—which may include the sleeve 130, manifold 140, and rear fitting 115—occupies a large percentage of the bladder 110 internal volume. Its length also doubles as a mechanical hard limit during actuation. This side of the PAM is fastened to the primary structure and provides a simplified interface for gas flow and electrical contact via the rear fitting 115.

The sleeve 130 provides the envelope for internal components and is also the base to which the bladder and braid become swaged with the swage tube.

The manifold 140 is the mount for sensors such as the pressure transducer 142 (control algorithm feedback sensor), inlet and outlet valves 145 (control algorithm outputs), and the component signal conditioning electronics board 148. The manifold 140 may be made using additive manufacturing combined with post-process machining due to the complexity and size of the internal flow channels. The manifold 140 forms a leak-tight seal against the sleeve 130 using the O-ring 135, and is vented to either the atmosphere, or a return line, on the opposite end. The manifold includes a pressure line and a return line configured to, with the at least one valve, selectively pressurize and depressurize the bladder, thereby providing a volume and mass efficient means of routing the pneumatic pressure and return lines.

In exemplary embodiments, the manifold is removable for servicing, thereby providing ready access to the internal components such as the valves, sensors (e.g., temperature, pressure, etc.), and any electronics, such as a signal conditioning device. For example, the manifold may be screwed into the sleeve via a threaded fitting therebetween.

In exemplary embodiments, the manifold is constructed to provide electrical wire harnessing and/or strain relief for wiring. Further, the manifold can be constructed to act as a heat sink for any electronics housed thereon. For example a printed circuit board (PCB) of the signal conditioning device may be thermally attached to the manifold via thermal paste disposed between a flat area of the manifold and an exposed conductor material on the PCB.

The swage tube 150 is the primary mechanism for load transition and sealing when it is formed around the end plugs.

Its sleeve and manifold design allows the PAM to be swaged without the manifold being present, which reduces risk of damage on the higher cost components. It also allows the manifold and electronics to be removed for servicing, testing, and replacement without having to destroy the PAM to access these internal components. The manifold and rear fitting mate together with a set of O-rings that seal and isolate each flow path, and are both fastened to the sleeve with screws.

It is noted that, while an exemplary PAM is described herein with respect to a swaging process, the invention is not limited to this form of manufacturing. Other processes, for example a crimping process, is also applicable for fixing the Swage Tube to the Sleeve.

An exemplary PAM may include piezo-proportionally actuated control valves. They may have, for example, a maximum operating pressure of 200 psi, and an operating voltage of 60 Vdc with approximately 20 mA dynamic current draw at max pressure. An exemplary pressure transducer is a Meggitt 8510B-200 with a 200 psi pressure-compensated operating range. An exemplary interface for this unit is interchangeable with a Kulite HKL/T-235 combination pressure and temperature sensor, giving an exemplary control algorithm the ability to adjust the model as a function of temperature. Exemplary control electronics may include a custom designed board containing, for example, two operational amplifiers: one boosting the control signal to the valves from 0-10 V to 0-60 V; the other amplifying the transducer signal from 0-100 mV to 0-10 V to the ND. The board may interface with the spacecraft computer with two 4-wire twisted/shielded pigtails, for example.

Again, although the invention is described herein with specific examples, it is noted that the invention is not so limited. Any properly sized valve, sensors, and signal conditioning can be employed within the Sleeve and mounted to the Manifold.

Internally mounting these components significantly reduces the overall arm complexity and operating envelope. A 7-DOF arm requires 14 PAMs, which includes 28 valves and 14 pressure transducers. Reducing the integration and interface requirements from 46 individual components to 14 components represents a substantial improvement in the simplification of spacecraft engineering. From this starting point, harness routing and gas supply can be centralized and the structure can be optimized for low mass, because it does not have to support mounting additional components.

In an exemplary embodiment, the ported plug subassembly occupies 77 cc (4.7 in3) of usable PAM volume, and the bladder internal volume is 130 cc (7.9 in3) in the free unpressurized state. This results in an ideal zero-load, unpressurized working volume of 52 cc (3.2 in3). The exemplary embodiment's pressure-actuation volume is decreased by 51% in the zero-contraction state and 25% in the free fully contracted pressurized state by using the equations:

$$\%_{r,0} = \frac{V_{port\ plug}}{V_{meas,0} + V_{port\ plug}} * 100 \tag{1}$$

$$\%_{r,MOP} = \frac{V_{port\ plug}}{V_{meas,MOP} + V_{port\ plug}} * 100 \tag{2}$$

These smaller gas actuation-volumes will provide a significant reduction in the amount of gas required for actuation in satellite servicing operations. Subsequently, this offers a reduction in weight for a smaller required gas-storage reservoir, or provides longer duration for an equivalently sized gas storage reservoir.

Figure 2:
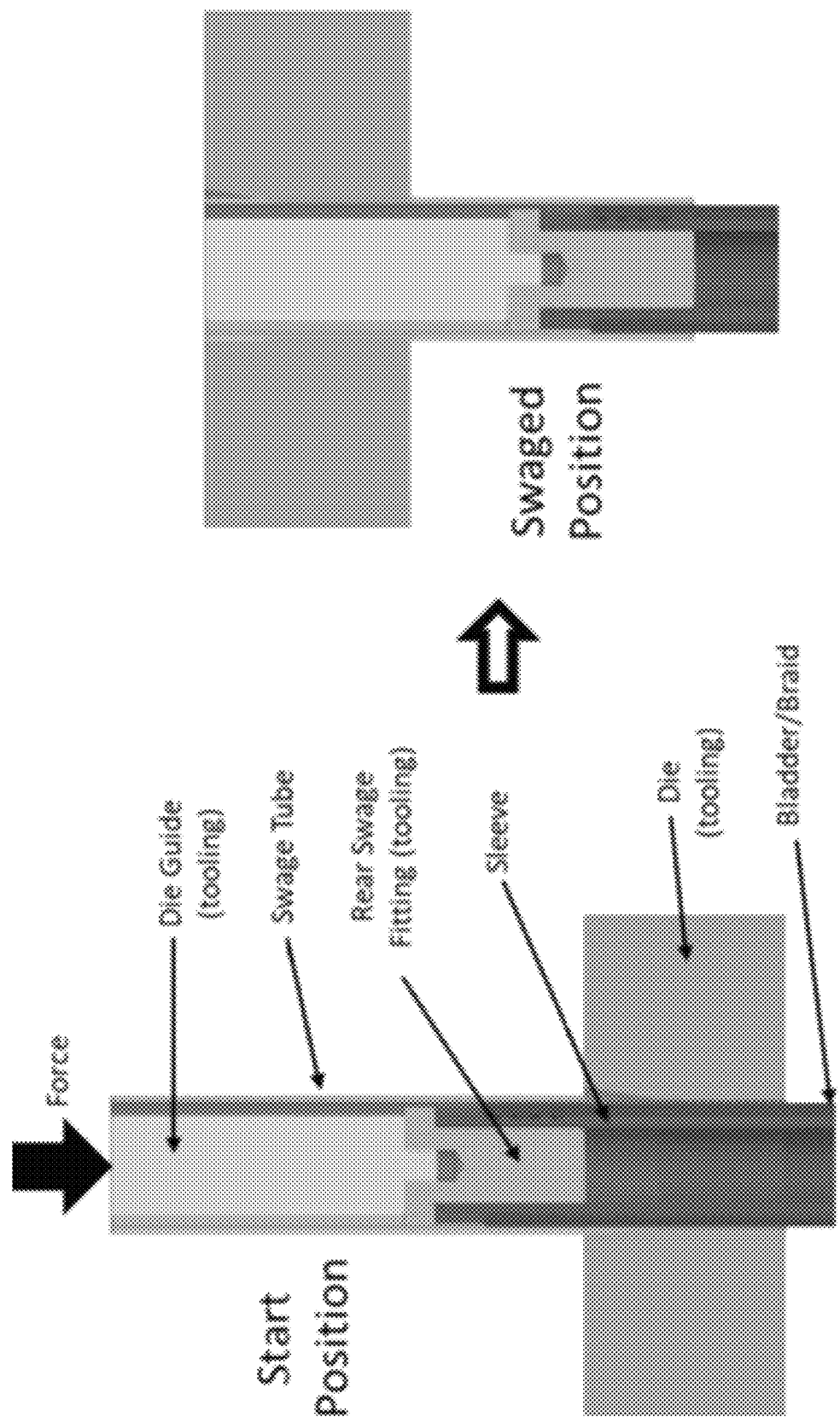
FIG. 2 shows PAM end fittings being formed by a process similar to cold indirect extrusion.

The PAM end fittings may be formed by a process similar to cold indirect extrusion (FIG. 2). The end fitting assembly may be pressed as a unit through a tapered die—an action that compressively cold-work yields the swage tube to a smaller diameter. The formed swage tube maintains enough strength to hold all of the components in place during axial loading.

Figure 3:
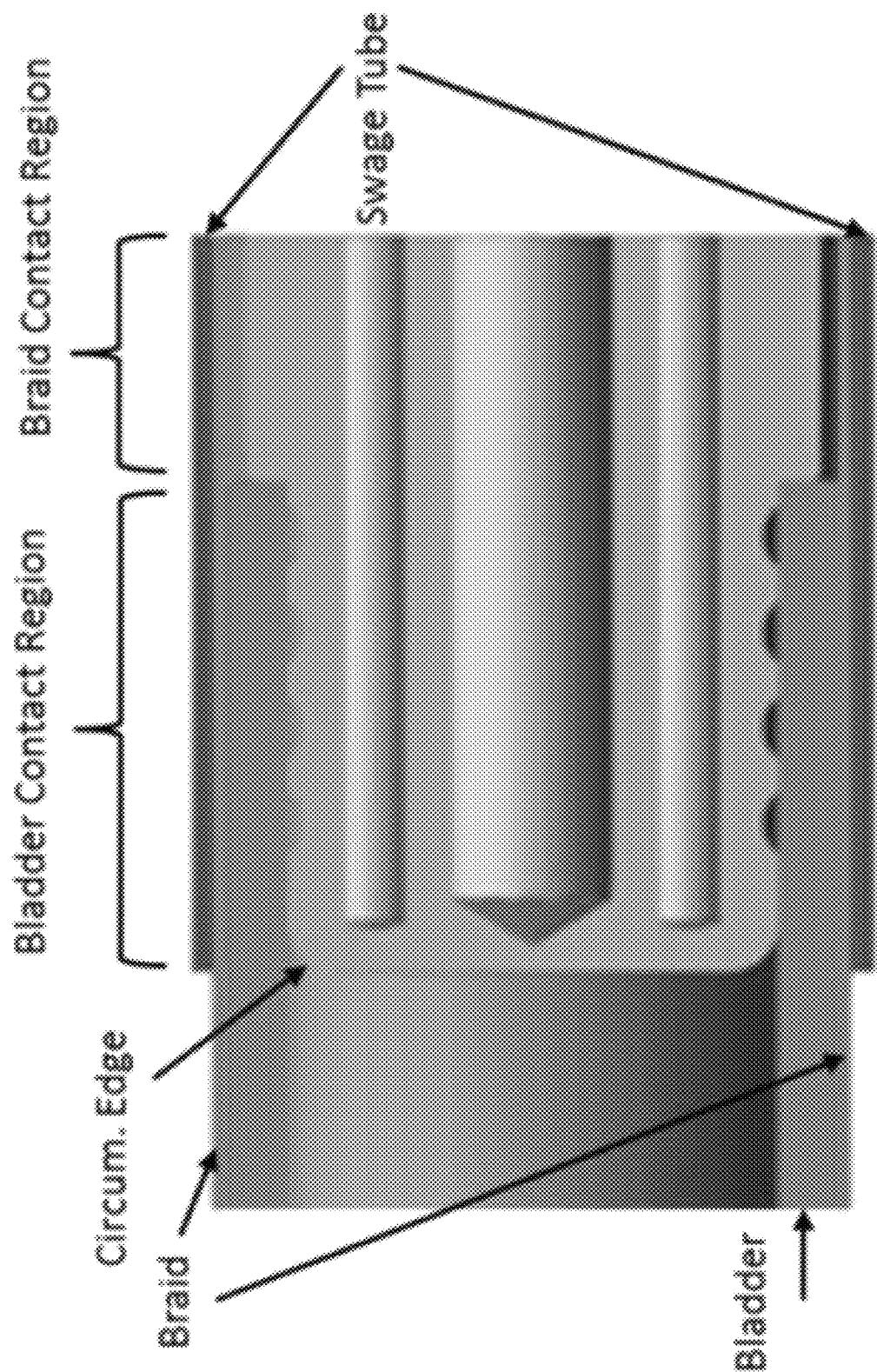
FIG. 3 shows end plug features that are important in the swaging process: the circumferential edge, the bladder contact region, and the braid contact region.

The end plug features that are important in the swaging process are the circumferential edge, the bladder contact region, and the braid contact region. FIG. 3 shows these features on the Blind Plug specifically, but they are common to both ends. Each of these features presented an interface that could cause damage to the PAM moving parts or create a condition that could impede assembly and/or functionality. Also shown are the center threaded mechanical interface and two lightening holes above and below, which are specific to the blind plug.

As described above, several independent variables must be considered and evaluated when designing PAM components. These variables feed into the plug and die design, which, if dimensioned properly, are key components in a successful swage. The following paragraphs quantitatively show how to dimension these critical components and the following subsections will present a qualitative approach to their design.

The nominal internal diameter of the bladder ($ID_{bladder}$) determines the maximum potential actuator force for any given bladder/braid combination. The bladder thickness ($Th_{bladder}$) and the braid thickness ($Th_{braid}$) can both have significant effects on the operational performance of the PAM. The last dimension needed in the calculation is the swage tube thickness ($Th_{tube}$). The swage tube's "pre-swage" inner diameter is best set to provide some interference with the bladder/braid assembly to facilitate the fabrication process.

These dimensions, along with the percent compression of the bladder (% $C_{bladder}$) and the braid (% $C_{braid}$), are used to define the critical dimensions of the die inner passage diameter ($ID_{die}$) and the outer diameter of the plug knurled surface ($OD_{knurl}$). The following equations were used to set the knurled plug and die dimensions assuming that the braid is not compressed in the bladder compression region, and that the swage tube thickness does not change during swaging.

$$OD_{knurl} = ID_{bladder} + 2*Th_{bladder}*(1-\% C_{bladder}) + 2*Th_{braid}*\% C_{braid} \quad (3)$$

$$ID_{die} = ID_{bladder} + 2*Th_{bladder}*(1-\% C_{bladder}) + 2*Th_{braid} + 2*Th_{tube} \quad (4)$$

The circumferential edge is the terminus of the plug, which ideally aligns with the edge of the swage tube if manufactured properly. This location carries a large stress concentration in the bladder due to its motion during inflation and hyperextension (axial motion beyond rest state). These stress concentrations can be amplified by sharp edges on the plug and swage tube. The plug edge has a smooth radius to reduce this effect during hyperextension. The swage tube was not given a similar stress reducing radius for three reasons: 1) the braid provides a protective layer over the bladder; 2) it creates a stress concentration in the swage tube during inflation; and 3) it added relatively significant cost to the part.

The bladder contact region of the plug is the critical swage location where the bladder will experience its compression. The plug's ribbed surface OD matched the bladder ID in this design, though this dimensional match it is not required for success. However, the design process must account for any initial reduction in bladder thickness due to stretching over the plug due to an unmatched bladder diameter. Circumferential grooves were added to this surface for three reasons: 1) to allow space for the bladder to flow as it is compresses during the swaging process; 2) to increase resistance to axial slippage of the bladder by the actuation and inflation forces through large, smooth grips; and 3) to provide recesses for epoxy application to help fill in micro-gaps that could be the point source for gas leakage. This surface was lightly abraded to increase the bonding potential between the metal and the bladder.

The braid contact region of the plug should be tightly swaged to axially anchor the braid. The plug OD and the die ID determine the feasibility of the swaging process by setting the deformation limit of the swage tube, and by default, the amount of braid-bladder compression. The braid contact surface is knurled to more aggressively grip the braid than the grooves used for bladder gripping, and is the primary reason for the shorter contact length in the braid region. Epoxy was also applied to the knurl to improve braid-plug adhesion.

Bladder and braid contact lengths are a balance between sufficient surface area and mass minimization. The final design used a 1.0 inch bladder contact length, and a 0.5 inch braid contact length.

The swage tube is the physical mechanism for fastening the braid and bladder to the PAM structural interface. This is achieved by uniformly compressing a metal tube around the internal components by forcing the assembly through a relatively hard die, making a secure press-fit. The fastening is aided with the use of a small amount of epoxy.

The swage tube ID was sized to create a small amount of initial interference with the braid/bladder, and provide a small amount of grip to aid the assembly process. The wall thickness was defined as 0.050 inches. Its length was sized to allow the entire swage region of the end fitting to completely travel through the die. This configuration permits the functional part of the PAM to be removed without the trouble of pressing the entire swage tube through the die.

The two primary pieces of tooling used during the swaging process are the die and die guide. These parts may be made of 17-4 PH stainless steel to provide a harder boundary for the relatively soft swage components. The die is the large metal block through which the pre-swaged PAM assembly is pressed.

The main swage passage in the die is the final PAM end fitting OD after compression stack-up. It has a 10° chamfered, ¾-inch long lead-in to allow a smooth swaging operation. The die guide is the small cylindrical column that transfers the pressed load to the plug without concentrating stress on the swage tube, and allows the entire assembly to move as a unit without any slipping between the parts. The length of this part was defined in conjunction with the swage tube length.

Each plug may be lightly abraded on the bonding surfaces using Scotch-brite™ pads to facilitate adhesion, and then thoroughly cleaned in an ultrasonic bath. The bladder may be wiped thoroughly using isopropyl alcohol and lint free cloths to remove residual nonvolatile fluids and particulates. The ported plug, mated with the die guide, may receive a thin layer of epoxy over the ribbed grooves. The plug may then be inserted into the bladder until the edge aligned with the last groove lip, not touching the knurled shoulder, and another thin layer of epoxy applied to the knurled surface.

The braid should be cut several inches longer than the length of the overall PAM with uncut swage tubes installed, as this will aid in handling during swage tube installation. The braid may be laid over the plug/bladder assembly and pulled taut while eliminating waves and ruffles in the fabric. These cause weak points in the PAM during actuation, and will reduce performance. The swage tube is installed over the braid from the blind plug side if possible, and pulled across the entire length of the PAM until its end is flush with the die guide installed on the ported plug. This helps smooth out the braid and keep it taut under the swage tube. The swage tube design may include some interference with the bladder/braid assembly during this process. (This sequence also may be done from the ported plug side with similar outcome, but it is more difficult to maintain braid tautness.)

After applying a thin coat of lubricant to the die cylindrical and conical sections and a generous amount of lubricant on the exterior of the swage tube, the entire assembly may be inserted blind plug side first into the die in the direction of the pressing motion. Extra braid protruding from the swage tube was trimmed as much as possible; whatever little braid remains should be splayed evenly over the top of the swage tube during the press.

An adequately sized hydraulic press may be used to slowly press the swage tube through the die guide with smooth and even strokes to ensure that the swage tube moves commensurate with each piston stroke. The swage tube may be marked with graduations for better observation of the assembly motion during pressing. The piston may be raised after every 4-7 strokes to alleviate any residual stresses being built up in the swage tube. This reduces the likelihood of swage-tube seizing and buckling. The swage tube may extend slightly as it elastically rebounds from the compressive state when removing the piston load.

The press continues until the ram is flush with the die. The swage tube may then be cut at any point above the plug and between the die. The PAM may then be pulled through the die with the swage tube remnants remaining in the die (which can be removed by gently tapping back through the die). All lubricant may then be removed from the die internal surfaces. Die edges and bore surfaces should be checked for potential burrs and/or gouges, which should be removed or repaired as necessary.

The process for swaging the blind plug is similar to the ported plug with a few exceptions. The die guide is installed on the blind plug, the braid is peeled back, and epoxy is applied to the plug grooves and knurl before insertion into the bladder. A light coat of lubricant may be applied to the die cylindrical and conical surfaces prior to inserting the free end through the die in the opposite direction of the pressing motion until the ported end swage tube contacts the bottom of the die. (This helps remove potential braid slack, which would otherwise become ruffled and trapped.) The braid may then be pulled taut while maintaining weave straightness and removing any ruffles. The swage tube may then be installed over the braid while maintaining braid tautness until the end is flush with the die guide inside the braid. A liberal coat of lubricant can then be applied to the exterior of the swage tube, followed by press-swaging as described above.

Specimens can be completely cured for a minimum of 24 hours after swaging both ends. After this period, the fabrication process may be completed by removing excess swage tube beyond the knurled surface of each plug using a table grinder.

Each PAM may then be subjected to a proof pressure test of 1.5× its max operating pressure (1035 kPa [150 psig] for this embodiment), and cycled a minimum of five times at 345-690 kPa (50-100 psi) to mobilize the braid and allow it to settle. This exercise occasionally creates a small amount of braid slack in the unpressurized state—a feature that slightly degrades performance, but may be unavoidable. Leak integrity may be verified using bubble soap around the swaged sections and by monitoring pressure decay over time. Following this, the PAMs may be thoroughly cleaned with isopropyl alcohol wipes until they are free from visible particulates and discoloration from the manufacturing process.

Optionally, the bladders may be, for example, custom-cured Viton tubes to which may eliminate residual curvature of commercial coiled tubing. Further, Kevlar braid or, more preferably, Vectran braid may be used.

In the context of manufacturing this type of PAM, the term "swaging" refers to pressing the end fitting assembly through a die. This action uniformly yields the swage tube to a smaller diameter and fastens the bladder and braid to the end fittings, joining the major PAM components to make the "pressure vessel."

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pneumatic artificial muscle (PAM), comprising:
   a bladder;
   at least one valve controlling pneumatic pressure inside the bladder;
   at least one sensor configured to sense pressure inside the bladder;
   at least one signal conditioning device;
   a sleeve located inside the bladder and configured to act as a housing for the at least one valve, the at least one sensor, and the at least one signal conditioning device, wherein the sleeve is sealed against pressure changes of the bladder; and
   a manifold disposed within the sleeve;
   wherein the at least one valve, the at least one sensor, and the at least one signal conditioning device are located within the bladder and mounted on the manifold.

2. The PAM of claim 1, wherein the manifold includes a pressure line and a return line configured to, with the at least one valve, selectively pressurize and depressurize the bladder.

3. The PAM of claim 1, wherein the manifold is removable.

4. The PAM of claim 1, wherein the manifold is configured to provide electrical wire harnessing and strain relief.

5. The PAM of claim 1, wherein the manifold is configured to transfer heat from the at least one signal conditioning device to the manifold, thereby acting as a heat sink.

6. The PAM of claim 5, wherein a printed circuit board (PCB) of the at least one signal conditioning device includes an exposed conductor material thermally coupled to the manifold.

7. The PAM of claim 1, wherein the manifold and an end fitting of the bladder mate together with at least one O-ring that seals and isolates each flow path.

8. The PAM of claim 7, wherein the manifold and end fitting are both fastened to the sleeve.

9. The PAM of claim 1, wherein the bladder includes end fittings configured to provide electrical wire harnessing and strain relief.

\* \* \* \* \*